(12) United States Patent
Taguchi

(10) Patent No.: US 11,281,017 B2
(45) Date of Patent: Mar. 22, 2022

(54) HALF MIRROR, METHOD FOR PRODUCING HALF MIRROR, AND MIRROR WITH IMAGE DISPLAY FUNCTION

(71) Applicant: FUJIFILM Corporation, Tokyo (JP)

(72) Inventor: Takao Taguchi, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 273 days.

(21) Appl. No.: 16/450,425

(22) Filed: Jun. 24, 2019

(65) Prior Publication Data

US 2019/0310488 A1 Oct. 10, 2019

Related U.S. Application Data

(63) Continuation of application No. PCT/JP2017/046233, filed on Dec. 22, 2017.

(30) Foreign Application Priority Data

Feb. 9, 2017 (JP) .............................. JP2017-022263

(51) Int. Cl.
*G02B 27/28* (2006.01)
*G02B 5/30* (2006.01)
*G02B 5/26* (2006.01)
*B32B 27/30* (2006.01)
*G02B 5/08* (2006.01)
*B32B 17/10* (2006.01)

(52) U.S. Cl.
CPC ............ *G02B 27/288* (2013.01); *B32B 17/10* (2013.01); *B32B 27/30* (2013.01); *G02B 5/08* (2013.01); *G02B 5/26* (2013.01); *G02B 5/30* (2013.01); *G02B 5/3016* (2013.01)

(58) Field of Classification Search
CPC .... G02B 27/28; G02B 27/283; G02B 27/288; G02B 5/08; G02B 5/26; G02B 5/30; G02B 5/3016; B32B 17/10; B32B 27/30
See application file for complete search history.

(56) References Cited

U.S. PATENT DOCUMENTS

| | | | |
|---|---|---|---|
| 10,054,818 B2 | 8/2018 | Sakai et al. | |
| 10,126,474 B2 | 11/2018 | Anzai et al. | |
| 2009/0079909 A1 | 3/2009 | Ouderkirk et al. | |
| 2010/0304134 A1* | 12/2010 | Nakano | C09J 7/385 428/343 |
| 2016/0266297 A1* | 9/2016 | Hikmet | F21V 9/32 |
| 2017/0067593 A1 | 3/2017 | Mitsumoto et al. | |

FOREIGN PATENT DOCUMENTS

| | | |
|---|---|---|
| CN | 1137772 A | 12/1998 |
| CN | 101819293 A | 9/2010 |
| CN | 103890118 A | 6/2014 |
| CN | 105308143 A | 2/2016 |
| CN | 105729962 A | 7/2016 |
| EP | 2241911 A1 | 10/2016 |
| JP | 2004-125885 A | 4/2004 |
| JP | 2009-75595 A | 4/2009 |
| JP | JR 2011-45427 A | 3/2011 |
| JP | 2011-93957 A | 5/2011 |
| JP | 4805240 B2 | 11/2011 |
| JP | 2013-242392 A | 12/2013 |
| JP | 2016-16538 A | 2/2016 |
| JP | 2016-35046 A | 3/2016 |
| JP | 2016-71351 A | 5/2016 |
| JP | 2016-224292 A | 12/2016 |
| JP | 2017-53967 A | 3/2017 |
| WO | WO 2016/006507 A1 | 1/2016 |
| WO | WO 2016/088707 A1 | 6/2016 |
| WO | WO 2016/194890 A1 | 12/2016 |

OTHER PUBLICATIONS

Ishida et al., CN 103890118 A, Jun. 25, 2014, English Language Machine Translation, generated Oct. 1, 2021 (Year: 2014).*
Extended European Search Report, dated Jan. 28. 2020, for European Application No. 17895580.3.
Japanese Office Action, dated Jan. 12, 2021, for Japanese Application No. 2016-566790, with an English translation.
International Preliminary Report on Patentability and Written Opinion of the International Searching Authority, dated Aug. 22, 2019, for International Application No. PCT/JP2017/046233, with an English Translation of the Written Opinion.
International Search Report, dated Apr. 3, 2018, for International Application No. PCT/JP2017/046233, with an English translation.
Chinese Office Action dated Nov. 20, 2020 for corresponding Application No. 201780081339.0 with an English translation.
Japanese Notice of Reasons for Refusal for Japanese Application No. 2018-566790, dated Jun. 23, 2020, with an English translation.
Chinese Office Action and Search Report for corresponding Chinese Application No. 201780081339.0, dated May 21, 2021, with English translation of the Office Action.

* cited by examiner

Primary Examiner — Derek S. Chapel
Assistant Examiner — Adam W Booher
(74) Attorney, Agent, or Firm — Birch, Stewart, Kolasch & Birch, LLP

(57) ABSTRACT

A half mirror includes, in sequence, a glass plate, an adhesive layer, and a polarized light reflecting layer having a thickness of 5.0 μm or more and 80 μm or less. The adhesive layer has a thickness of 3 μm to 15 μm and is a layer formed by UV-curing of a composition containing an acrylic polymer having a weight-average molecular weight of 800,000 to 2,000,000, a crosslinker, and a silane coupling agent. The total amount of the crosslinker is 1.0 mass % to 8.0 mass % of the amount of the acrylic polymer, and 80 mass % or more of the crosslinker is accounted for by a photo-crosslinker.

10 Claims, No Drawings

HALF MIRROR, METHOD FOR PRODUCING HALF MIRROR, AND MIRROR WITH IMAGE DISPLAY FUNCTION

CROSS-REFERENCE TO RELATED APPLICATIONS

This application is a Continuation of PCT International Application No. PCT/JP2017/46233, filed on Dec. 22, 2017, which claims priority under 35 U.S.C. § 119(a) to Japanese Patent Application No. 2017-022263, filed on Feb. 9, 2017. Each of the above application(s) is hereby expressly incorporated by reference, in its entirety, into the present application.

BACKGROUND OF THE INVENTION

1. Field of the Invention

The present invention relates to a half mirror. The present invention particularly relates to a half mirror used for an image display surface of an image display device. The present invention also relates to a method for producing such a half mirror and to a mirror with an image display function including such a half mirror.

2. Description of the Related Art

Disposing a half mirror including a reflective polarizing plate and other constituents on an image display surface of an image display device can provide a configuration that allows the image display device to display an image when the image is displayed on an image display unit and to act as a specular surface when no images are displayed on the image display unit.

WO2016/088707A and WO2016/194890A each disclose a mirror with an image display function obtained by transferring a circularly polarized light reflecting layer to a front panel such as a glass plate to fabricate a half mirror, the circularly polarized light reflecting layer including a layer in which a cholesteric liquid crystalline phase is fixed, and bonding the half mirror to an image display surface of an image display device.

SUMMARY OF THE INVENTION

In producing a half mirror as disclosed in WO2016/088707A or WO2016/194890A, a thin film reflection layer is bonded to a thick transparent substrate such as a glass plate with a bonding layer or an adhesive layer interposed therebetween.

As already described in WO2016/194890A, when an OCA tape (high-transparency adhesive transfer tape), which is commonly used for an image display unit surface of an image display device, is used as the bonding layer, a distortion may be visually observed in a mirror-reflected image viewed from the transparent substrate side of the half mirror. This phenomenon is due to orange-peel-like irregularities on the OCA tape. In WO2016/194890A, a configuration is provided that prevents distortion by using a bonding layer that is formed of a curing adhesive and has a thickness of 5.0 μm or less and adjusting the pencil hardness of the circularly polarized light reflecting layer during bonding.

However, using a curing adhesive results in, for example, adhesive squeeze-out which may hinder industrial production of a half mirror.

An object of the present invention to provide a half mirror that enables display of bright and clear images and mirror-reflected images when used for an image display unit surface or the like of an image display device and that also has a configuration suitable for industrial production. Another object of the present invention is to provide a mirror with an image display function capable of displaying bright and clear images and mirror-reflected images.

The inventors have studied and attempted to produce a half mirror having a configuration in which a sheet-like adhesive layer, which is suitable for industrial production, is used as the bonding layer and causing no visually observable distortions. As a result, the inventors have found an adhesive layer composition that can solve the above-described problems and completed the present invention on the basis of the finding.

Thus, the present invention provides [1] to [10] below.

[1] A half mirror including, in sequence, a transparent substrate, an adhesive layer, and a polarized light reflecting layer, wherein the transparent substrate and the adhesive layer are in direct contact with each other, and the adhesive layer and the polarized light reflecting layer are in direct contact with each other, the half mirror has an image clarity value of 90% or more at an optical comb of 0.5 mm, an image clarity value of 70% or more at an optical comb of 0.125 mm, and a visible light reflectivity of 30% or more, the image clarity values being determined by a method for measuring image clarity in accordance with JIS K7374 in a reflectivity mode at an angle of 45° from the transparent substrate side, the transparent substrate is a glass plate, the polarized light reflecting layer has a thickness of 5.0 μm to 80 μm, the adhesive layer is a layer formed by UV-curing of a composition containing an acrylic polymer having a weight-average molecular weight of 800,000 to 2,000,000, a crosslinker, and a silane coupling agent, the total amount of the crosslinker is 1.0 mass % to 8.0 mass % of the amount of the acrylic polymer, 80 mass % or more of the crosslinker is accounted for by a photo-crosslinker, and the adhesive layer has a thickness of 3 μm to 15 μm.

[2] The half mirror according to [1], wherein the transparent substrate and the polarized light reflecting layer are bonded to each other with the adhesive layer.

[3] The half mirror according to [1] or [2], wherein the polarized light reflecting layer includes a cholesteric liquid crystal layer.

[4] The half mirror according to any one of [1] to [3], wherein the polarized light reflecting layer includes two or more cholesteric liquid crystal layers, and the two or more cholesteric liquid crystal layers have different selective reflection center wavelengths.

[5] The half mirror according to [3] or [4], further including a quarter-wave plate, wherein the transparent substrate, the adhesive layer, the polarized light reflecting layer, and the quarter-wave plate are disposed in this order.

[6] The half mirror according to [1] or [2], wherein the polarized light reflecting layer is a linearly polarized light reflecting layer having a multilayer structure in which differently birefringent resins are alternately stacked.

[7] A method for producing a half mirror including, in sequence, a transparent substrate, an adhesive layer, and a polarized light reflecting layer, the method including the successive steps of:

providing, as the adhesive layer, a layer formed by UV-curing of a composition containing an acrylic polymer having a weight-average molecular weight of 800,000 to 2,000,000, a crosslinker, and a silane coupling agent, the total amount of the crosslinker being 1.0 mass % to 8.0 mass % of the amount of the acrylic polymer, 80 mass % or more of the crosslinker being accounted for by a photo-crosslinker; and bonding the polarized light reflecting layer and the transparent substrate to each other with the adhesive layer interposed therebetween, wherein the half mirror has an image clarity value of 90% or more at an optical comb of 0.5 mm, an image clarity value of 70% or more at an optical comb of 0.125 mm, and a visible light reflectivity of 30% or more, the image clarity values being determined by a method for measuring image clarity in accordance with JIS K7374 in a reflectivity mode at an angle of 45° from the transparent substrate side, the transparent substrate is a glass plate, and the polarized light reflecting layer has a thickness of 5.0 μm to 80 μm.

[8] The method according to [7], wherein the adhesive layer is provided on a surface of a release sheet, and the release sheet is peeled off before the bonding.

[9] The method according to [8], wherein the UV-curing is performed on the composition applied to the surface of the release sheet.

[10] A mirror with an image display function, including an image display device, and the half mirror according to any one of [1] to [6], wherein the image display device, the polarized light reflecting layer, the adhesive layer, and the transparent substrate are disposed in this order.

The present invention provides a half mirror that enables display of bright and clear images and mirror-reflected images when used for an image display unit surface or the like of an image display device and that also has a configuration suitable for industrial production, and a method for producing such a half mirror. By using the half mirror, a mirror with an image display function capable of displaying bright and clear images and mirror-reflected images can be provided.

DESCRIPTION OF THE PREFERRED EMBODIMENTS

The present invention will now be described in detail.

In this specification, the expression " . . . to . . . " is meant to include the numerical values before and after "to" as the lower and upper limits. In this specification, expressions related to angles, such as "45°", "parallel", "perpendicular", and "orthogonal", imply that the difference from the exact angle is less than 5 degrees unless otherwise specified. The difference from the exact angle is preferably less than 4 degrees, more preferably less than 3 degrees.

In this specification, the term "(meth)acrylate" is used to mean "one or both of acrylate and methacrylate".

In this specification, the term "selective" used in the context of circular polarization means that the light quantity of one of the right-handed circularly polarized component or the left-handed circularly polarized component is greater than that of the other circularly polarized component. Specifically, when the term "selective" is used, the degree of circular polarization of light is preferably 0.3 or more, more preferably 0.6 or more, still more preferably 0.8 or more, further more preferably substantially 1.0. The degree of circular polarization is a value expressed by $|I_R-I_L|/(I_R+I_L)$, where $I_R$ is an intensity of the right-handed circularly polarized component of light, and $I_L$ is an intensity of the left-handed circularly polarized component.

In this specification, the term "sense" used in the context of circular polarization means that the circular polarization is right-handed or left-handed. The sense of circular polarization is defined as follows: when light is viewed such that it travels toward the viewer, if the end point of an electric field vector circulates clockwise with time, the circular polarization is right-handed, and if the end point circulates counterclockwise, the circular polarization is left-handed.

In this specification, the term "sense" may be used in the context of the twisted direction of the helix of a cholesteric liquid crystal. When the twisted direction (sense) of the helix of a cholesteric liquid crystal is right, right-handed circularly polarized light is reflected, and left-handed circularly polarized light is transmitted. When the sense is left, left-handed circularly polarized light is reflected, and right-handed circularly polarized light is transmitted.

Visible light is a type of electromagnetic radiation that has wavelengths visible to the human eye and is in the wavelength range of 380 nm to 780 nm.

In this specification, visible light reflectivities are values calculated by a calculation method described in JIS A5759. Specifically, reflectivities at wavelengths of 380 nm to 780 nm are measured with a spectrophotometer and multiplied by the weighting coefficient obtained from the spectral distribution of CIE (International Commission on Illumination) daylight D65 and the wavelength distribution and wavelength interval of CIE photopic spectral luminous efficiency function, and a weighted average is calculated to determine a light reflectivity.

For example, a V-670 spectrophotometer manufactured by JASCO Corporation can be used to measure a visible light reflectivity.

In this specification, the term "image" used in the context of a mirror with an image display function or a half mirror refers to an image that is visually observable from the transparent substrate side of the half mirror when the image is displayed by an image display unit during use as the mirror with an image display function or during use as a part incorporated into the mirror with an image display function. In this specification, the term "mirror-reflected image" used in the context of a mirror with an image display function or a half mirror refers to an image that is visually observable from the transparent substrate side when no images are displayed by an image display unit during use as the mirror with an image display function or during use as a part incorporated into the mirror with an image display function.

Half Mirror

In this specification, a half mirror is a member that reflects light having at least some predetermined wavelengths in the visible range and transmits light having at least some wavelengths in the visible range.

The half mirror has an image clarity value of 90% or more at an optical comb of 0.5 mm, an image clarity value of 70% or more at an optical comb of 0.125 mm, and a visible light reflectivity of 30% or more, the image clarity values being determined by a method for measuring image clarity in accordance with JIS K7374 (JIS K7374: 2007) in a reflectivity mode at an angle of 45° from the transparent substrate side. In the reflectivity mode, light is incident from the transparent substrate side at 45° with respect to the normal to the transparent substrate and reflected to the transparent substrate side.

The half mirror having image clarity values and a visible light reflectivity in the above ranges is suitable, for example, for image display device applications. This is because the half mirror having image clarity values and a visible light reflectivity in the above ranges, when mounted such that image light from an image display device is transmitted to an image display unit surface, provides images and mirror-reflected images having sufficient brightness and clarity. The half mirror can be used, particularly, with its polarized light reflecting layer side surface facing an image display unit surface of an image display device. When no images are displayed on the image display unit, the half mirror mounted on the image display unit surface can be used as a specular surface.

The above-described distortion that may occur in a mirror-reflected image viewed from the transparent substrate side of the half mirror including, in sequence, a polarized light reflecting layer, an adhesive layer, and a transparent substrate is probably due to scattering of reflected light in the visible range at a portion of orange-peel-like irregularities on the polarized light reflecting layer surface. When a film including a polarized light reflecting layer is used for film lamination in an image display device, orange-peel-like irregularities are less observable. When a film with a low visible light reflectivity is used, even on an image display unit surface of an image display device, orange-peel-like irregularities are less observable. The inventors have discovered that using an adhesive layer with a particular composition and thickness as a layer for bonding a polarized light reflecting layer and a transparent substrate to each other in a half mirror can reduce distortion in mirror-reflected images.

The degree of orange-peel-like irregularities can be determined based on how clearly a mirror-reflected image of the half mirror is seen without distortion (the clarity of an image). Specifically, it can be considered that the higher the clarity of an image, the less orange-peel-like irregularities. The clarity of an image can be determined in accordance with JIS K7374. For example, the clarity of a mirror-reflected image can be measured using an ICM-IT manufactured by Suga Test Instruments Co., Ltd. as in Examples.

Preferably, the image clarity value of the half mirror measured as described above in a reflectivity mode at an angle of 45° from the transparent substrate side is 20% or more at an optical comb of 0.05 mm, and 70% or more at an optical comb of 0.125 mm.

The image clarity value of the half mirror is 90% or more, preferably 95% or more, at an optical comb of 0.5 mm. The image clarity value of the half mirror is 70% or more, preferably 75% or more, at an optical comb of 0.125 mm.

The half mirror includes, in sequence, a transparent substrate, an adhesive layer, and a polarized light reflecting layer. In the half mirror, the transparent substrate and the adhesive layer are in direct contact with each other, and the adhesive layer and the polarized light reflecting layer are in direct contact with each other. The components of the half mirror will now be described.

Transparent Substrate

In the half mirror, a glass plate is used as the transparent substrate. The glass plate may be, for example, a glass plate used to produce a common mirror.

The glass plate may be a glass plate whose surface is modified. For example, the glass plate may have, on its surface, an inorganic reflection layer. The modified surface may be the adhesive layer side surface or the opposite surface, and is preferably the adhesive layer side surface. When an inorganic reflection layer is used for modification, the adhesive layer side surface is preferably modified.

Examples of inorganic reflection layers include metal films and dielectric multilayer films. Examples of materials for forming a metal film include aluminum, silver, and silver alloys. The thickness of the metal film may be any thickness that can ensure sufficient reflection depending on the material for forming the metal film, and, for example, is preferably 0.5 nm to 50 nm, more preferably 1.0 nm to 25 nm. Examples of the method for forming the metal film include chemical vapor deposition (CVD) methods such as vacuum deposition, sputtering, and plasma enhanced chemical vapor deposition (PECVD) and physical vapor deposition (PVD) methods such as ion plating. In particular, the metal film is preferably a metallized layer formed by vacuum deposition.

The dielectric multilayer film can be formed, for example, by alternately stacking one or more dielectric thin films having a high refractive index and one or more dielectric thin films having a low refractive index on the above substrate. The number of types of layers need not necessarily be two, and other films than the above may further be used. The number of stacked layers is preferably 2 to 12, more preferably 2 to 8, still more preferably 4 to 6. The order of stacking of dielectric thin films is not particularly limited and can be appropriately selected according to the purpose. For example, when the refractive index of an adjacent film is high, a film having a lower refractive index than the adjacent film is stacked first. By contrast, when the refractive index of an adjacent layer is low, a film having a higher refractive index than the adjacent film is stacked first. The boundary between high and low refractive indices can be 1.8. Whether the refractive index is high or low is not absolute. There may be included in materials having high refractive indices a material having a relatively high refractive index and a material having a relatively low refractive index, and these may be stacked alternately. Examples of the material for the dielectric thin film having a high refractive index include $Sb_2O_3$, $Sb_2S_3$, $Bi_2O_3$, $CeO_2$, $CeF_3$, $HfO_2$, $La_2O_3$, $Nd_2O_3$, $Pr_6O_{11}$, $Sc_2O_3$, $SiO$, $Ta_2O_5$, $TiO_2$, $TlCl$, $Y_2O_3$, $ZnSe$, $ZnS$, and $ZrO_2$. Of these, $Bi_2O_3$, $CeO_2$, $CeF_3$, $HfO_2$, $SiO$, $Ta_2O_5$, $TiO_2$, $Y_2O_3$, $ZnSe$, $ZnS$, and $ZrO_2$ are preferred, and $SiO$, $Ta_2O_5$, $TiO_2$, $Y_2O_3$, $ZnSe$, $ZnS$, and $ZrO_2$ are more preferred. Examples of the material for the dielectric thin film having a low refractive index include $Al_2O_3$, $BiF_3$, $CaF_2$, $LaF_3$, $PbCl_2$, $PbF_2$, $LiF$, $MgF_2$, $MgO$, $NdF_3$, $SiO_2$, $Si_2O_3$, $NaF$, $ThO_2$, and $ThF_4$. Of these, $Al_2O_3$, $BiF_3$, $CaF_2$, $MgF_2$, $MgO$, $SiO_2$, and $Si_2O_3$ are preferred, and $Al_2O_3$, $CaF_2$, $MgF_2$, $MgO$, $SiO_2$, and $Si_2O_3$ are more preferred. The method of forming the dielectric thin films is not particularly limited and can be appropriately selected according to the purpose. Examples of the method include physical vapor deposition (PVD) methods and chemical vapor deposition (CVD) methods, such as ion plating, vacuum vapor deposition such as ion beam deposition, and sputtering. Of these, vacuum vapor deposition and sputtering are preferred, and sputtering is more preferred.

The thickness of the transparent substrate is about 500 μm to 10 mm, preferably 800 μm to 5.0 mm, more preferably 1.0 mm to 3.0 mm.

The area of the major surface of the transparent substrate may be larger than or equal to the area of the major surface of the polarized light reflecting layer. In this specification, the term "major surface" refers to a surface (front or rear surface) of a plate-like or film-like member. The polarized light reflecting layer may be bonded to a part of the major surface of the transparent substrate, and another type of reflecting layer such as metal foil may be bonded to or formed on the other part. Such a configuration enables an image display at a part of the mirror. Alternatively, in the half mirror, the polarized light reflecting layer may be bonded to the entire major surface of the transparent substrate, and furthermore, the half mirror may be bonded to an image display unit of an image display device, the image display unit having an area equal to the area of the major surface of the polarized light reflecting layer. Such a configuration enables an image display at the entire mirror surface.

Adhesive Layer

The half mirror includes an adhesive layer between a transparent substrate and a polarized light reflecting layer. The adhesive layer, like an OCA tape or the like, has a shape of a sheet that is already self-supporting in a step of bonding the transparent substrate and the polarized light reflecting layer to each other in half mirror production. The use of such a sheet-like adhesive layer facilitates the industrial production of the half mirror. This is because adhesive squeeze-out and the like cannot occur.

The adhesive layer of the half mirror preferably has a gel fraction of 40 to 90 mass %. The adhesive layer, which has a shape of a sheet that is already self-supporting in bonding like an OCA tape or the like, typically has a gel fraction in this range. The gel fraction is more preferably 50 to 90 mass %, still more preferably 50 to 80 mass %.

In this specification, the term "gel fraction" refers to a value (mass %) calculated as (W2/W1)×100, where W1 is the amount (g) of sampled adhesive layer, and W2 is the mass (g) of the resulting adhesive layer obtained by immersing the sampled adhesive layer in ethyl acetate at 23° C. for 7 days, then collecting insoluble matter from the ethyl acetate, and drying the insoluble matter at 130° C. for 2 hours.

A layer formed of a curing adhesive is typically insoluble in ethyl acetate and, therefore, has a gel fraction of about 100 mass %.

The adhesive layer is a layer formed by UV-curing of a composition containing an acrylic polymer having a molecular weight of 800,000 to 2,000,000, a crosslinker, and a silane coupling agent. In the composition, the total amount of crosslinker is 1.0 mass % to 8.0 mass % of the amount of the acrylic polymer, and 80 mass % or more of the crosslinker is accounted for by a photo-crosslinker.

The adhesive layer has a thickness of 3 μm to 15 μm. The thickness of the adhesive layer is preferably 4 μm or more, more preferably 5 μm or more.

Acrylic Polymer

The composition for adhesive layer formation contains an acrylic polymer.

The acrylic polymer is a polymer obtained using an alkyl (meth)acrylate as a monomer. An alkyl (meth)acrylate in which the average number of carbon atoms in an alkyl group is about 2 to 18 is used. The alkyl group may be either linear or branched. The average number of carbon atoms in the alkyl group is preferably 2 to 14, more preferably 3 to 12, still more preferably 4 to 9. Specific examples of alkyl (meth)acrylates include ethyl (meth)acrylate, n-butyl (meth)acrylate, s-butyl (meth)acrylate, t-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, isomyristyl (meth)acrylate, n-tridecyl (meth)acrylate, n-tetradecyl (meth)acrylate, stearyl (meth)acrylate, and isostearyl (meth) acrylate. The (meth)acrylic polymer may be a polymer obtained by polymerizing an alkyl (meth)acrylate and other comonomers. That is, the (meth)acrylic polymer may be a copolymer. Examples of comonomers include various functional-group-containing monomers. Examples of functional-group-containing monomers include carboxyl-group-containing monomers, hydroxyl-group-containing monomers, amide-group-containing monomers, and amino-group-containing monomers. The type of copolymerization is not particularly limited, and the copolymer may be a random, block, or graft copolymer.

The molecular weight of the acrylic polymer is 800,000 or more and 2,000,000 or less, preferably 1,200,000 or more and 1,800,000 or less.

In this specification, the term "molecular weight" means a weight-average molecular weight. Unless otherwise specified, weight-average molecular weights in this specification are values measured by gel permeation chromatography (GPC). The measurement of a weight-average molecular weight by GPC can be performed by the following procedure. A polymer obtained is isolated by removing a solvent, and the solid obtained is diluted with tetrahydrofuran to 0.1 mass %. The sample obtained is measured with an HLC-8020GPC (manufactured by Tosoh Corporation) using three TSKgel Super Multipore HZ-H columns (manufactured by Tosoh Corporation, 4.6 mm ID×15 cm) connected in series. The measurement can be performed using an RI detector under the following conditions: sample concentration, 0.35 mass %; flow rate, 0.35 mL/min; sample injection volume, 10 μL; measurement temperature, 40° C.

The acrylic polymer can be obtained by polymerization reaction of any one or more of the above-described monomers. The polymerization reaction can be performed, for example, by stirring a solution of a starting monomer and a polymerization initiator in a solvent with heating. Any solvent can be appropriately selected according to the purpose, and, for example, acetates such as ethyl acetate can be used. For example, the polymerization reaction is performed under a stream of an inert gas such as nitrogen typically at about 50° C. to 70° C. for about 5 to 30 hours with a polymerization initiator added.

The acrylic polymer may be a commercially available product.

Crosslinker

The composition for adhesive layer formation contains a crosslinker.

The total amount of crosslinker is 1.0 mass % or more and 8.0 mass % or less, preferably 5.0 mass % or less, preferably 1.5 mass % or more, based on the amount of the acrylic polymer.

The composition for adhesive layer formation contains at least a photo-crosslinker as a crosslinker, and 80 mass % or more of the total amount of crosslinker is accounted for by the photo-crosslinker. The photo-crosslinker accounts for preferably 85 mass % or more, more preferably 90 mass % or more, still more preferably 95 mass % or more, of the total amount of crosslinker.

Examples of photo-crosslinkers include 2-hydroxy-2-methyl-[4-(1-methylvinyl)phenyl]propanol oligomers; 1-[4-(2-hydroxyethoxy)-phenyl]-2-hydroxy-2-methyl-1-propan-1-one; alkylphenone compounds such as 2,2-dimethoxy-2-phenylacetophenone; benzoin; benzoin alkyl ethers such as benzoin methyl ether, benzoin ethyl ether, and benzoin isopropyl ether; and benzophenone compounds such as benzophenone.

Examples of crosslinkers other than photo-crosslinkers include thermal crosslinkers. Any thermal crosslinker that reacts with a reactive functional group (hydroxy or carboxy) of, for example, a (meth)acrylate copolymer may be used, and examples include isocyanate crosslinkers and epoxy crosslinkers. Any isocyanate crosslinker that contains at least a polyisocyanate compound may be used, and examples include aromatic polyisocyanates such as tolylene diisocyanate (e.g., trimethyltolylene diisocyanate), diphenylmethane diisocyanate, and xylylene diisocyanate; aliphatic polyisocyanates such as hexamethylene diisocyanate; and alicyclic polyisocyanates such as isophorone diisocyanate and hydrogenated diphenylmethane diisocyanate. Examples of epoxy crosslinkers include 1,3-bis(N,N'-diglycidylaminomethyl)cyclohexane, N,N,N',N'-tetraglycidyl-m-xylylenediamine, ethylene glycol diglycidyl ether, 1,6-hexanediol diglycidyl ether, trimethylolpropane diglycidyl ether, diglycidylaniline, and diglycidylamine.

Silane Coupling Agent

The composition for adhesive layer formation contains a silane coupling agent. The presence of a silane coupling agent in the composition for adhesive layer formation can improve the adhesiveness between the adhesive layer and the transparent substrate (glass plate). The silane coupling agent preferably remains present in the adhesive layer obtained by curing. Examples of silane coupling agents include compounds having a structure in which a hydrolyzable reactive group such as an alkyloxy group, e.g., methoxy or ethoxy, or an acetoxy group and a substituent having at least one reactive group selected from the group consisting, for example, of isocyanate, epoxy, vinyl, amino, halogen, mercapto, and (meth)acryloyl groups are bonded to one silicon atom, and compounds having a substructure in which two silicon atoms are bonded to each other through oxygen or —NH— and having a structure in which any of the above-described hydrolyzable reactive groups and a substituent having any of the above-described reactive groups are bonded to one of the silicon atoms. Specific examples of silane coupling agents include epoxy-group-containing silane coupling agents such as 3-glycidoxypropyltrimethoxysilane, 3-glycidoxypropyltriethoxysilane, 3-glycidoxypropylmethyldiethoxysilane, and 2-(3,4-epoxycyclohexyl)ethyltrimethoxysilane; amino-group-containing silane coupling agents such as 3-aminopropyltrimethoxysilane, N-2-(aminoethyl)-3-aminopropylmethyldimethoxysilane, 3-triethoxysilyl-N-(1,3-dimethylbutylidene)propylamine, and N-phenyl-γ-aminopropyltrimethoxysilane; and isocyanate-group-containing silane coupling agents such as 3-isocyanatepropyltriethoxysilane. Although these silane coupling agents may be used alone or as a mixture of two or more, the total amount of silane coupling agent is preferably 0.01 to 1 mass %, more preferably 0.06 to 0.6 mass %, based on the amount of the above-described acrylic polymer.

Method for Producing Adhesive Layer

The adhesive layer is a layer formed by UV-curing of the composition for adhesive layer formation containing the above-described components. The adhesive layer can be obtained by applying the composition for adhesive layer formation to a surface of a release sheet and curing the coating with ultraviolet light.

The composition for adhesive layer formation may contain a solvent in order, for example, to facilitate the above-described application. Any solvent can be appropriately selected according to the purpose, and, for example, acetates such as ethyl acetate can be used.

The release sheet is not particularly limited, and, for example, polyethylene terephthalate films treated with release agents such as silicone-based release agents can be used. Another release sheet may be disposed on the surface of the composition applied to the surface of the release sheet so as to UV-cure the composition sandwiched between the release sheets.

The irradiation energy in the UV-curing is preferably 20 mJ/cm$^2$ to 50 J/cm$^2$, more preferably 100 mJ/cm$^2$ to 1,500 mJ/cm$^2$. To promote photopolymerization, the photoirradiation may be performed under heating conditions or in a nitrogen atmosphere. The wavelength of ultraviolet radiation is preferably 300 nm to 430 nm.

The adhesive layer produced as described above is peeled off the release sheet in fabricating the half mirror and used to bond the transparent substrate and the polarized light reflecting layer to each other.

The adhesive layer may be a commercially available product.

Polarized Light Reflecting Layer

The half mirror includes a polarized light reflecting layer. The polarized light reflecting layer is a layer that reflects linearly polarized light, circularly polarized light, or elliptically polarized light.

The polarized light reflecting layer has a thickness of 80 μm or less, preferably 55 μm or less, more preferably 50 μm or less, still more preferably 35 μm or less, further more preferably 2.0 μm to 30 μm, particularly preferably 4.0 μm to 25 μm, most preferably 5.0 μm to 20 μm.

In the half mirror, the thinner the layer bonded to the transparent substrate, the more likely orange peel is to occur. In the present invention, when the thickness of the polarized light reflecting layer or the total thickness of a laminate of a polarized light reflecting layer that is a cholesteric circularly polarized light reflecting layer described below and a quarter-wave plate is 55 μm or less, particularly 35 μm or less, orange peel is significantly reduced.

The polarized light reflecting layer is preferably, for example, a linearly polarized light reflecting layer or a circularly polarized light reflecting layer.

Linearly Polarized Light Reflecting Layer

The linearly polarized light reflecting layer may be, for example, a polarizer formed of a laminate of differently birefringent thin films.

The polarizer formed of a laminate of differently birefringent thin films may be, for example, a polarizer described in JP1997-506837A (JP-H9-506837A). Specifically, the polarizer can be formed using a wide variety of materials through processing under conditions selected to achieve a refractive index relationship. In general, one of first materials needs to have a refractive index different from that of a second material in a selected direction. This difference in refractive index can be achieved by various methods including stretching during or after film formation, extrusion molding, and coating. In addition, the two materials preferably have similar rheological properties (e.g., melt viscosity) so that they can be coextruded.

The polarizer formed of a laminate of differently birefringent thin films may be a commercially available product, and examples of commercially available polarizers include optical films marketed as DBEF (registered trademark) (manufactured by 3M) and APF (advanced polarizing film, manufactured by 3M).

The linearly polarized light reflecting layer preferably has a thickness in the range of 2.0 μm to 50 μm, more preferably in the range of 8.0 to 30 μm.

Circularly Polarized Light Reflecting Layer

Circularly polarized light reflecting layers are polarized light reflecting layers whose transmitted light and reflected light are each circularly polarized light. Thus, a mirror with an image display function including a half mirror including a circularly polarized light reflecting layer, even through polarizing sunglasses, allows the observation of display images and mirror-reflected images regardless of the direction in which the mirror with an image display function faces.

Examples of circularly polarized light reflecting layers include a circularly polarized light reflecting layer including a linearly polarized light reflecting plate and a quarter-wave plate, and a circularly polarized light reflecting layer including a cholesteric liquid crystal layer (hereinafter also referred to as a "Pol λ/4 circularly polarized light reflecting layer" and a "cholesteric circularly polarized light reflecting layer" to distinguish one from the other).

Pol λ/4 Circularly Polarized Light Reflecting Layer

In the Pol λ/4 circularly polarized light reflecting layer, the linearly polarized light reflecting plate and the quarter-wave plate are disposed such that the slow axis of the quarter-wave plate makes an angle of 45° with the polarized light reflection axis of the linearly polarized light reflecting plate. The quarter-wave plate and the linearly polarized light reflecting plate are bonded to each other, for example, with a bonding layer.

Disposing the linearly polarized light reflecting plate in the Pol λ/4 circularly polarized light reflecting layer so as to be closer to an image display device enables light for image display from the image display device to be efficiently converted to circularly polarized light and emitted from the front of the mirror with an image display function. When the light for image display from the image display device is linearly polarized light, the polarized light reflection axis of the linearly polarized light reflecting plate is adjusted so that the linearly polarized light is transmitted.

The Pol λ/4 circularly polarized light reflecting layer preferably has a thickness in the range of 2.0 μm to 50 μm, more preferably in the range of 8.0 μm to 40 μm.

The linearly polarized light reflecting plate may be the linearly polarized light reflecting layer described above.

The quarter-wave plate may be a quarter-wave plate described below.

Cholesteric Circularly Polarized Light Reflecting Layer

The cholesteric circularly polarized light reflecting layer includes at least one cholesteric liquid crystal layer. The cholesteric liquid crystal layer in the cholesteric circularly polarized light reflecting layer may be any layer that exhibits selective reflection in the visible range.

The circularly polarized light reflecting layer may include two or more cholesteric liquid crystal layers and may include another layer such as an alignment layer. Preferably, the circularly polarized light reflecting layer is composed solely of cholesteric liquid crystal layers. When the circularly polarized light reflecting layer includes a plurality of cholesteric liquid crystal layers, they are preferably each in direct contact with their adjacent cholesteric liquid crystal layers. The circularly polarized light reflecting layer preferably includes three or more, for example, three or four, cholesteric liquid crystal layers.

The cholesteric circularly polarized light reflecting layer has a thickness of 80 μm or less, preferably 55 μm or less, more preferably 50 μm or less, still more preferably 35 μm or less, further more preferably in the range of 2.0 μm to 30 μm, particularly preferably in the range 4.0 μm to 20 μm.

Cholesteric Liquid Crystal Layer

In this specification, the term "cholesteric liquid crystal layer" refers to a layer in which a cholesteric liquid crystalline phase is fixed. The cholesteric liquid crystal layer may be referred to simply as the liquid crystal layer.

The cholesteric liquid crystalline phase is known to exhibit circularly polarized light selective reflection, that is, to selectively reflect circularly polarized light of one sense, either right-handed circularly polarized light or left-handed circularly polarized light, and transmit circularly polarized light of the opposite sense in a specific wavelength range. In this specification, circularly polarized light selective reflection may be referred to simply as selective reflection.

As films including layers in which such cholesteric liquid crystalline phases that exhibit circularly polarized light selective reflection are fixed, many films formed of compositions containing polymerizable liquid crystal compounds have been conventionally known. Regarding the cholesteric liquid crystal layers, refer to the related art thereof.

The cholesteric liquid crystal layer may be any layer in which the alignment of a liquid crystal compound forming a cholesteric liquid crystalline phase is maintained. Typically, the cholesteric liquid crystal layer is a layer that is formed by bringing a polymerizable liquid crystal compound into the state of cholesteric liquid crystalline phase alignment and then polymerizing and curing the compound, for example, by UV irradiation or heating, so that the layer has no fluidity and at the same time undergoes no change in its alignment state when acted upon by an external field or an external force. In the cholesteric liquid crystal layer, it is only necessary that the optical properties of the cholesteric liquid crystalline phase be maintained in the layer, and the liquid crystal compound in the layer need not exhibit liquid crystallinity. For example, the polymerizable liquid crystal compound may lose its liquid crystallinity as a result of an increase in molecular weight due to curing reaction.

The selective reflection center wavelength λ of the cholesteric liquid crystal layer depends on the pitch P (=helical period) of a helical structure in a cholesteric phase and is related to n, an average refractive index of the cholesteric liquid crystal layer, by the formula λ=n×P. In this specification, the selective reflection center wavelength λ of the cholesteric liquid crystal layer means a wavelength at the centroid of a reflection peak in a circular polarization reflection spectrum measured from the direction normal to the cholesteric liquid crystal layer. In this specification, the selective reflection center wavelength means a center wavelength measured in the direction normal to the cholesteric liquid crystal layer.

As can be seen from the above formula, the selective reflection center wavelength can be adjusted by adjusting the pitch of the helical structure. By adjusting the n value and the P value, the center wavelength λ can be adjusted in order to selectively reflect either right-handed circularly polarized light or left-handed circularly polarized light when light having a given wavelength is received.

When light is obliquely incident on the cholesteric liquid crystal layer, the selective reflection center wavelength shifts to the short wavelength side. Thus, n×P is preferably adjusted such that λ calculated according to the formula λ=n×P is longer than the selective reflection wavelength required for image display. When a light beam passes through a cholesteric liquid crystal layer having a refractive index $n_2$ at an angle $\theta_2$ with respect to the direction normal to the cholesteric liquid crystal layer (the helical axis direction of the cholesteric liquid crystal layer), the selective reflection center wavelength $\lambda_d$ is expressed by the following formula.

$$\lambda_d = n_2 \times P \times \cos \theta_2$$

By designing the selective reflection center wavelength of the cholesteric liquid crystal layer included in the circularly polarized light reflecting layer taking into account the foregoing, the decrease in image visibility at oblique angles can be prevented. On the other hand, image visibility at oblique angles can be reduced. This is advantageous, for example, for smartphones and personal computers because peeping can be prevented.

Due to the above-described selective reflection properties, display images and mirror-reflected images of a mirror with an image display function including a half mirror may have tints when viewed obliquely. Such tints can be prevented by incorporating a cholesteric liquid crystal layer having a selective reflection center wavelength in the infrared range into the circularly polarized light reflecting layer. In this case, the selective reflection center wavelength in the infrared range is specifically in the range of 780 to 900 nm, preferably 780 to 850 nm.

The pitch of the cholesteric liquid crystalline phase depends on the type of chiral agent used with the polymerizable liquid crystal compound and the concentration of the chiral agent added, and thus the desired pitch can be achieved by adjusting these conditions. The sense and pitch of a helix can be measured by using methods described in page 46 of "Ekisho Kagaku Jikken Nyumon (Introduction of Liquid Crystal Chemical Experiments)" edited by The Japanese Liquid Crystal Society, published by SIGMA SHUPPAN, 2007 and page 196 of "Handbook of Liquid Crystals" edited by the Editorial Board of the Handbook of Liquid Crystals, published by Maruzen Co., Ltd.

In the half mirror, the circularly polarized light reflecting layer preferably includes a cholesteric liquid crystal layer having a selective reflection center wavelength in the red light wavelength range, a cholesteric liquid crystal layer having a selective reflection center wavelength in the green light wavelength range, and a cholesteric liquid crystal layer having a selective reflection center wavelength in the blue light wavelength range. For example, the reflecting layer preferably includes a cholesteric liquid crystal layer having a selective reflection center wavelength in the range of 400 nm to 500 nm, a cholesteric liquid crystal layer having a selective reflection center wavelength in the range of 500 nm to 580 nm, and a cholesteric liquid crystal layer having a selective reflection center wavelength in the range of 580 nm to 700 nm.

In the half mirror, the selective reflection center wavelengths of the cholesteric liquid crystal layers may be adjusted as described below based on the light emission peak of an image display device used in combination. Specifically, the selective reflection center wavelengths of the cholesteric liquid crystal layers may be different from the light emission peak wavelength of the image display device by 5 nm or more, preferably 10 nm or more. In particular, this adjustment is preferably performed in the case of a half mirror not including the quarter-wave plate described below. Such a difference between the selective reflection center wavelength and the light emission peak wavelength for image display of the image display device prevents light for image display from being reflected by the cholesteric liquid crystal layer, and as a result, a bright image can be displayed. The light emission peak wavelength of the image display device can be determined by an emission spectrum of the image display device at the time of white display. The peak wavelength is a peak wavelength in the visible range of the emission spectrum, for example, at least one selected from the group consisting of a red light emission peak wavelength $\lambda R$, a green light emission peak wavelength $\lambda G$, and a blue light emission peak wavelength $\lambda B$ of the image display device. The selective reflection center wavelength of each cholesteric liquid crystal layer is preferably different from the red light emission peak wavelength $\lambda R$, the green light emission peak wavelength $\lambda G$, and the blue light emission peak wavelength $\lambda B$ of the image display device each by 5 nm or more, more preferably 10 nm or more. When the circularly polarized light reflecting layer includes a plurality of cholesteric liquid crystal layers, the selective reflection center wavelengths of all the cholesteric liquid crystal layers are set to be different from the peak wavelength of light emitted from the image display device by 5 nm or more, preferably 10 nm or more. For example, when the image display device is a full-color display device that has a red light emission peak wavelength $\lambda R$, a green light emission peak wavelength $\lambda G$, and a blue light emission peak wavelength $\lambda B$ in its emission spectrum at the time of white display, all the selective reflection center wavelengths of the cholesteric liquid crystal layers are set to be different from $\lambda R$, $\lambda G$, and $\lambda B$ each by 5 nm or more, preferably 10 nm or more When the cholesteric circularly polarized light reflecting layer includes a plurality of cholesteric liquid crystal layers, the cholesteric liquid crystal layer closer to the image display device preferably has a longer selective reflection center wavelength. This configuration can reduce tints in display images and mirror-reflected images viewed obliquely.

By adjusting the selective reflection center wavelength of the cholesteric liquid crystal layer for use according to the emission wavelength range of the image display device and the conditions for the use of the cholesteric circularly polarized light reflecting layer, bright images can be displayed with good light use efficiency. Specific examples of the conditions for the use of the cholesteric circularly polarized light reflecting layer include the angle of light incidence on the circularly polarized light reflecting layer and the direction of image observation.

Each cholesteric liquid crystal layer has either a right-handed or left-handed helical sense. The sense of reflected circularly polarized light of each cholesteric liquid crystal layer is in agreement with its helical sense. When the circularly polarized light reflecting layer includes a plurality of cholesteric liquid crystal layers, their helical senses may be all the same or not. The cholesteric liquid crystal layers having particular selective reflection center wavelengths may each be a cholesteric liquid crystal layer having either a right-handed or left-handed sense or a cholesteric liquid crystal layer having both right-handed and left-handed senses.

In a half mirror including the quarter-wave plate described below, a cholesteric liquid crystal layer having either a right-handed or left-handed helical sense is used according to the sense of circularly polarized light produced as a result of exiting the image display device and passing through the quarter-wave plate. Specifically, a cholesteric liquid crystal layer is used having a helical sense that allows passage of circularly polarized light having a sense produced as a result of exiting the image display device and passing through the quarter-wave plate. When the circularly polarized light reflecting layer includes a plurality of cholesteric liquid crystal layers, their helical senses are preferably all the same.

The half-width $\Delta\lambda$ (nm) of a selective reflection band where selective reflection is exhibited depends on the birefringence $\Delta n$ of the liquid crystal compound and the above-described pitch P and satisfies the relation $\Delta\lambda=\Delta n\times P$. Therefore, the width of the selective reflection band can be controlled by adjusting $\Delta n$. $\Delta n$ can be adjusted by adjusting the type and mixing ratio of polymerizable liquid crystal compound or by controlling the temperature at which the alignment is fixed.

To form cholesteric liquid crystal layers of the same type having the same selective reflection center wavelength, a plurality of cholesteric liquid crystal layers having the same period P and the same helical sense may be stacked on top of each other. Stacking cholesteric liquid crystal layers having the same period P and the same helical sense on top of each other can increase the circular polarization selectivity at a particular wavelength.

Quarter-Wave Plate

The mirror with an image display function including a cholesteric circularly polarized light reflecting layer may further include a quarter-wave plate.

When the half mirror is used in the mirror with an image display function, disposing the quarter-wave plate between the image display device and the circularly polarized light reflecting layer enables light from the image display device to be converted, before entering the circularly polarized light reflecting layer, to circularly polarized light having a sense that allows passage through the circularly polarized light reflecting layer. As a result, the amount of light that is reflected by the circularly polarized light reflecting layer and returns to the image display device side can be significantly reduced, thus enabling display of bright images.

The quarter-wave plate is a phase difference layer that functions as a quarter-wave plate in the visible range. The quarter-wave plate may be, for example, a single-layer quarter-wave plate or a broadband quarter-wave plate formed of a laminate of a quarter-wave plate and a half-wave phase difference plate.

The front phase difference of the former quarter-wave plate is four times shorter than the emission wavelength of the image display device. Therefore, for example, when the emission wavelength of the image display device is 450 nm, 530 nm, and 640 nm, the quarter-wave plate is most preferably a phase difference layer with reverse dispersion having a phase difference of 112.5 nm±10 nm, preferably 112.5 nm±5 nm, more preferably 112.5 nm at a wavelength of 450 nm, a phase difference of 132.5 nm±10 nm, preferably 132.5 nm±5 nm, more preferably 132.5 nm at a wavelength of 530 nm, and a phase difference of 160 nm±10 nm, preferably 160 nm±5 nm, more preferably 160 nm at a wavelength of 640 nm. The quarter-wave plate may also be a phase difference plate having a phase difference with small wavelength dispersion or a phase difference plate with normal dispersion. Reverse dispersion means that the absolute value of phase difference increases with increasing wavelength, and normal dispersion means that the absolute value of phase difference increases with decreasing wavelength.

A laminate-type quarter-wave plate is used in such a manner that a quarter-wave plate and a half-wave phase difference plate are stacked on top of each other with their slow axes making an angle of 60°, the half-wave phase difference plate is disposed on the side on which linearly polarized light is incident, and the slow axis of the half-wave phase difference plate makes an angle of 15° or 75° with a plane of polarization of incident linearly polarized light. The laminate-type quarter-wave plate is suitable for use for its good reverse dispersion of phase difference.

In this specification, a phase difference means front retardation. The phase difference can be measured using an AxoScan polarized light/phase difference analyzer manufactured by Axometrics. Alternatively, the phase difference may be measured using a KOBRA 21ADH or WR (manufactured by Oji Scientific Instruments) by casting light having a particular wavelength in the direction normal to a film.

Any quarter-wave plate may be appropriately selected according to the purpose. Examples include quartz plates, stretched polycarbonate films, stretched norbornene polymer films, aligned transparent films containing birefringent inorganic particles such as strontium carbonate, and thin films obtained by oblique vapor deposition of inorganic dielectrics on supports.

Examples of quarter-wave plates include (1) retardation plates including a birefringent film having a large retardation and a birefringent film having a small retardation that are stacked on top of each other such that their optical axes are orthogonal to each other, as described in JP1993-27118A (JP-H5-27118A) and JP1993-27119A (JP-H5-27119A), (2) a retardation plate in which a polymer film that acts as a quarter-wave plate at a specific wavelength and a polymer film that is made of the same material and acts as a half-wave plate at the specific wavelength are stacked on top of each other to thereby provide a quarter wavelength in a wide range of wavelengths, as described in JP1998-68816A (JP-H10-68816A), (3) a retardation plate in which two polymer films are stacked on top of each other to thereby achieve a quarter wavelength in a wide range of wavelengths, as described in JP1998-90521A (JP-H10-90521A), (4) a retardation plate that includes a modified polycarbonate film and achieves a quarter wavelength in a wide range of wavelengths, as described in WO00/26705A, and (5) a retardation plate that includes a cellulose acetate film and achieves a quarter wavelength in a wide range of wavelengths, as described in WO00/65384A.

The quarter-wave plate may be a commercially available product, and examples of commercially available quarter-wave plates include PURE-ACE (registered trademark) WR (polycarbonate film, manufactured by Teijin Limited).

The quarter-wave plate is preferably formed by aligning and fixing a polymerizable liquid crystal compound or a high-molecular liquid crystal compound. For example, the quarter-wave plate can be formed by applying a liquid crystal composition to a temporary support or an alignment film and then nematically aligning the polymerizable liquid crystal compound in the liquid crystalline state in the liquid crystal composition, followed by fixation by photo-crosslinking or thermal crosslinking. The quarter-wave plate may also be a layer obtained by applying a liquid crystal composition containing a high-molecular liquid crystal compound to a surface of a temporary support or an alignment film and nematically aligning the composition in the liquid crystalline state, followed by cooling to fix the alignment.

When the quarter-wave plate is formed from a composition containing a liquid crystal compound, the total thickness of the quarter-wave plate and the polarized light reflecting layer is preferably 80 μm or less, more preferably 55 μm or less, still more preferably 50 μm or less, further more preferably 35 μm or less, particularly preferably 2.0 μm to 30 μm, most preferably 4.0 μm to 25 μm.

Methods for Producing Quarter-Wave Plate and Cholesteric Liquid Crystal Layer

Materials and methods for producing a cholesteric liquid crystal layer and a quarter-wave plate formed of a liquid crystal composition will now be described.

The material used to form the above-described quarter-wave plate may be, for example, a liquid crystal composition containing a polymerizable liquid crystal compound. The material used to form the cholesteric liquid crystal layer preferably further contains a chiral agent (optically active compound). The quarter-wave plate or the cholesteric liquid crystal layer can be formed by applying the liquid crystal composition, which may optionally be mixed with a surfactant, a polymerization initiator, or the like and dissolved in a solvent or the like, to a temporary support, an alignment film, a quarter-wave plate, or a cholesteric liquid crystal layer to serve as an underlayer and performing maturing of alignment, followed by fixation by curing of the liquid crystal composition.

Polymerizable Liquid Crystal Compound

The polymerizable liquid crystal compound may be a rod-like liquid crystal compound.

Examples of rod-like polymerizable liquid crystal compounds include rod-like nematic liquid crystal compounds. Examples of rod-like nematic liquid crystal compounds that are suitable for use include azomethines, azoxies, cyanobiphenyls, cyanophenyl esters, benzoic acid esters, cyclohexanecarboxylic acid phenyl esters, cyanophenyl cyclohexanes, cyano-substituted phenylpyrimidines, alkoxy-substituted phenylpyrimidines, phenyldioxanes, tolans, and alkenyl cyclohexyl benzonitriles. High-molecular liquid crystal compounds as well as low-molecular liquid crystal compounds can be used.

The polymerizable liquid crystal compound is obtained by introducing a polymerizable group into a liquid crystal compound. Examples of polymerizable groups include unsaturated polymerizable groups, an epoxy group, and an aziridinyl group. Unsaturated polymerizable groups are preferred, and ethylenically unsaturated polymerizable groups are more preferred. The polymerizable group can be introduced into the molecules of a liquid crystal compound by various methods. The number of polymerizable groups in the polymerizable liquid crystal compound is preferably 1 to 6, more preferably 1 to 3. Examples of polymerizable liquid crystal compounds include compounds described in Makromol. Chem., vol. 190, p. 2255 (1989), Advanced Materials, vol. 5, p. 107 (1993), U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. Combined use of two or more polymerizable liquid crystal compounds enables alignment at lower temperatures.

The amount of polymerizable liquid crystal compound in the liquid crystal composition is preferably 80 to 99.9 mass %, more preferably 85 to 99.5 mass %, still more preferably 90 to 99 mass %, based on the mass of solids (the mass excluding the mass of solvent) in the liquid crystal composition.

Chiral Agent: Optically Active Compound

The material used to form a cholesteric liquid crystal layer preferably contains a chiral agent. The chiral agent has a function of inducing a helical structure of the cholesteric liquid crystalline phase. The chiral compound may be selected according to the purpose since the helical sense or helical pitch to be induced varies depending on the compound.

The chiral agent may be any known compound. Examples of chiral agents include compounds described in Liquid Crystal Device Handbook (chapter 3, section 4-3, Chiral Agent for TN and STN, page 199, edited by 142nd Committee of Japan Society for the Promotion of Science, 1989), JP2003-287623A, JP2002-302487A, JP2002-80478A, JP2002-80851A, JP2010-181852A, and JP2014-034581A.

Although chiral agents generally contain asymmetric carbon atoms, axial asymmetric compounds and planar asymmetric compounds, which contain no asymmetric carbon atoms, can also be used as chiral agents. Examples of axial asymmetric compounds and planar asymmetric compounds include binaphthyls, helicenes, paracyclophanes, and derivatives thereof. The chiral agent may have a polymerizable group. When the chiral agent and the liquid crystal compound each have a polymerizable group, a polymer having a repeating unit derived from the polymerizable liquid crystal compound and a repeating unit derived from the chiral agent can be formed by polymerization reaction of the polymerizable chiral agent and the polymerizable liquid crystal compound. In this case, the polymerizable group of the polymerizable chiral agent is preferably the same group as the polymerizable group of the polymerizable liquid crystal compound. Therefore, the polymerizable group of the chiral agent is also preferably an unsaturated polymerizable group, an epoxy group, or an aziridinyl group, more preferably an unsaturated polymerizable group, still more preferably an ethylenically unsaturated polymerizable group.

The chiral agent may be a liquid crystal compound.

The chiral agent is preferably an isosorbide derivative, an isomannide derivative, or a binaphthyl derivative. The isosorbide derivative may be a commercially available product such as LC-756 manufactured by BASF.

The amount of chiral agent in the liquid crystal composition is preferably 0.01 mol % to 200 mol %, more preferably 1 mol % to 30 mol %, based on the total molar quantity of the polymerizable liquid crystal compound.

Polymerization Initiator

The liquid crystal composition preferably contains a polymerization initiator. In the case where polymerization reaction is driven by ultraviolet irradiation, the polymerization initiator for use is preferably a photopolymerization initiator capable of initiating polymerization reaction in response to ultraviolet irradiation. Examples of photopolymerization initiators include α-carbonyl compounds (described in U.S. Pat. Nos. 2,367,661A and 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combinations of triarylimidazole dimers and p-aminophenyl ketone (described in U.S. Pat. No. 3,549,367A), acridine and phenazine compounds (described in JP1985-105667A (JP-S60-105667A) and U.S. Pat. No. 4,239,850A), acylphosphine oxide compounds (described in JP1988-40799B (JP-S63-40799B), JP1993-29234B (JP-H5-29234B), JP1998-95788A (JP-H10-95788A), JP1998-29997A (JP-H10-29997A), JP2001-233842A, JP2000-80068A, JP2006-342166A, JP2013-114249A, JP2014-137466A, JP4223071B, JP2010-262028A, and JP2014-500852A), oxime compounds (described in JP2000-66385A and JP4454067B), and oxadiazole compounds (described in U.S. Pat. No. 4,212,970A). For example, reference can also be made to the description in paragraphs 0500 to 0547 of JP2012-208494A.

The polymerization initiator is also preferably an acylphosphine oxide compound or an oxime compound.

The acylphosphine oxide compound may be, for example, a commercially available IRGACURE 819 (compound name: bis(2,4,6-trimethylbenzoyl)-phenylphosphine oxide) manufactured by BASF Japan. Examples of oxime compounds that can be used include commercially available products such as IRGACURE OXE01 (manufactured by BASF), IRGACURE OXE02 (manufactured by BASF), TR-PBG-304 (manufactured by Changzhou Tronly New Electronic Materials Co., Ltd.), ADEKA ARKLS NCI-831, ADEKA ARKLS NCI-930 (manufactured by ADEKA Corporation), and ADEKA ARKLS NCI-831 (manufactured by ADEKA Corporation).

These polymerization initiators may be used alone or in combination.

The amount of polymerization initiator in the liquid crystal composition is preferably 0.1 to 20 mass %, more preferably 0.5 mass % to 5 mass %, based on the amount of polymerizable liquid crystal compound.

Crosslinker

The liquid crystal composition may optionally contain a crosslinker in order to provide improved film hardness and improved durability after curing. Crosslinkers that are curable by ultraviolet light, heat, moisture, and the like are suitable for use.

Any crosslinker may be appropriately selected according to the purpose. Examples include polyfunctional acrylate compounds such as trimethylolpropane tri(meth)acrylate, pentaerythritol tri(meth)acrylate, and pentaerythritol tetra(meth)acrylate; epoxy compounds such as glycidyl (meth)acrylate and ethylene glycol diglycidyl ether; aziridine compounds such as 2,2-bishydroxymethylbutanol-tris[3-(1-aziridinyl)propionate] and 4,4-bis(ethyleneiminocarbonylamino)diphenylmethane; isocyanate compounds such as hexamethylene diisocyanate and biuret-type isocyanate; polyoxazoline compounds having oxazoline side groups; and alkoxysilane compounds such as vinyltrimethoxysilane and N-(2-aminoethyl)3-aminopropyltrimethoxysilane. Of these, polyfunctional acrylate compounds are preferred. Among the polyfunctional acrylate compounds, trifunctional to hexafunctional acrylate compounds are preferred, and tetrafunctional to hexafunctional acrylate compounds are more preferred. In addition, a known catalyst can be used according to the reactivity of the crosslinker. The use of a known catalyst can improve the productivity in addition to the film hardness and the durability. These crosslinkers may be used alone or in combination.

The amount of crosslinker in the liquid crystal composition is preferably 0 parts by mass to 8.0 parts by mass, more preferably 0.1 parts by mass to 7.0 parts by mass, still more preferably 0.2 parts by mass to 5.5 parts by mass, provided that the amount of polymerizable liquid crystal compound in the liquid crystal composition is 100 parts by mass.

Alignment Controlling Agent

An alignment controlling agent that contributes to stably or rapidly achieving planar alignment may be added into the liquid crystal composition. Examples of alignment controlling agents include fluorine (meth)acrylate polymers described in paragraphs [0018] to [0043] of JP2007-272185A and compounds represented by formulae (I) to (IV) described in paragraphs [0031] to [0034] of JP2012-203237A.

These alignment controlling agents may be used alone or in combination.

The amount of alignment controlling agent in the liquid crystal composition is preferably 0.01 mass % to 10 mass %, more preferably 0.01 mass % to 5.0 mass %, still more preferably 0.02 mass % to 1.0 mass %, based on the total mass of the polymerizable liquid crystal compound.

Other Additives

In addition, the liquid crystal composition may contain at least one selected from the group consisting of various additives such as polymerizable monomers and surfactants for adjusting the surface tension of a coating to make the coating thickness uniform. Optionally, the liquid crystal composition may further contain, for example, a polymerization inhibitor, an antioxidant, an ultraviolet absorber, a light stabilizer, a coloring material, and fine metal oxide particles to the extent that the optical performance is not degraded.

Solvent

For the preparation of the liquid crystal composition, any solvent may be appropriately selected according to the purpose. Organic solvents are suitable for use.

Any organic solvent may be appropriately selected according to the purpose. Examples include ketones, alkyl halides, amides, sulfoxides, heterocyclic compounds, hydrocarbons, esters, and ethers. These may be used alone or in combination. Of these, ketones are particularly preferred in view of environmental load.

Application, Alignment, and Polymerization

For the application of the liquid crystal composition to a temporary support, an alignment film, a quarter-wave plate, a cholesteric liquid crystal layer to serve as an underlayer, or the like, any method may be appropriately selected according to the purpose. Examples include wire bar coating, curtain coating, extrusion coating, direct gravure coating, reverse gravure coating, die coating, spin coating, dip coating, spray coating, and slide coating. Alternatively, the application can also be performed by transferring the liquid crystal composition applied to another support. The liquid crystal composition applied is heated to align liquid crystal molecules. When a cholesteric liquid crystal layer is formed, the molecules are cholesterically aligned. When a quarter-wave plate is formed, the molecules are preferably nematically aligned. The heating temperature for cholesteric alignment is preferably 200° C. or lower, more preferably 130° C. or lower. This alignment treatment provides an optical thin film in which the polymerizable liquid crystal compound is twistedly aligned so as to have a helical axis in a direction substantially perpendicular to the film plane.

The heating temperature for nematic alignment is preferably 50° C. to 120° C., more preferably 60° C. to 100° C.

The aligned liquid crystal compound can be further polymerized to be cured. The polymerization may be thermal polymerization or photopolymerization using photoirradiation and is preferably photopolymerization. For the photoirradiation, ultraviolet rays are preferably used. The irradiation energy is preferably 20 mJ/cm$^2$ to 50 J/cm$^2$, more preferably 100 mJ/cm$^2$ to 1,500 mJ/cm$^2$. To promote the photopolymerization, the photoirradiation may be performed under heating conditions or in a nitrogen atmosphere. The wavelength of ultraviolet radiation is preferably 350 nm to 430 nm. From the viewpoint of stability, the rate of polymerization reaction is preferably high, specifically, 70% or more, more preferably 80% or more. The rate of polymerization reaction can be determined by measuring the consumption rate of polymerizable functional groups by using an IR absorption spectrum.

The thickness of each cholesteric liquid crystal layer is not particularly limited as long as the properties described above are exhibited, but preferably 1.0 µm or more and 20 µm or less, more preferably 2.0 µm or more and 10 µm or less.

The thickness of the quarter-wave plate formed of the liquid crystal composition is not particularly limited, but preferably 0.2 µm to 10 µm, more preferably 0.5 µm to 2.0 µm.

Temporary Support

The liquid crystal composition may be formed as a layer by being applied to a surface of a temporary support or an alignment layer formed on a surface of the temporary support. The temporary support or the temporary support and alignment layer may be peeled off after the layer formation, for example, after the layers are bonded to the transparent substrate. Examples of temporary supports include polyesters such as polyethylene terephthalate (PET), polycarbonates, acrylic resins, epoxy resins, polyurethanes, polyamides, polyolefins, cellulose derivatives, silicones, and glass plates.

The temporary support has a thickness of about 5 μm to 1000 μm, preferably 10 μm to 250 μm, more preferably 15 μm to 120 μm.

Alignment Layer

The alignment layer can be provided by means of, for example, rubbing treatment of an organic compound such as a polymer (resin such as polyimide, polyvinyl alcohol, polyester, polyarylate, polyamide-imide, polyetherimide, polyamide, or modified polyamide), oblique deposition of an inorganic compound, formation of a layer having microgrooves, or accumulation of an organic compound (e.g., ω-tricosanoic acid, dioctadecylmethylammonium chloride, or methyl stearate) by the Langmuir-Blodgett method (LB film). Furthermore, an alignment layer whose alignment function is activated by application of an electric field, application of a magnetic field, or photoirradiation may be used.

In particular, preferably, an alignment layer made of a polymer is subjected to rubbing treatment, and then the liquid crystal composition is applied to the rubbing-treated surface. The rubbing treatment can be performed by rubbing a surface of the polymer layer with paper or cloth in a certain direction several times.

The liquid crystal composition may be applied to a surface of the temporary support or a rubbing-treated surface of the temporary support without providing an alignment layer.

The alignment layer preferably has a thickness of 0.01 μm to 5.0 μm, more preferably 0.05 μm to 2.0 μm.

Laminated Film of Quarter-Wave Plate and Cholesteric Liquid Crystal Layer

As described above, the cholesteric liquid crystal layer or the quarter-wave plate can be formed by applying a liquid crystal composition, which is obtained by dissolving a polymerizable liquid crystal compound, a polymerization initiator, and optional additives such as a chiral agent and a surfactant in a solvent, to, for example, a temporary support, an alignment layer, a quarter-wave plate, or a previously formed cholesteric liquid crystal layer, drying the liquid crystal composition to provide a coating, aligning the polymerizable liquid crystal compound in the coating in a desired manner, and then polymerizing the polymerizable compound to fix the alignment.

A laminate of layers formed of the polymerizable liquid crystal compound can be formed by repeating the above procedure. Some of the layers or some of the laminated films may be separately produced and bonded with a bonding layer.

To form a laminated film composed of a plurality of cholesteric liquid crystal layers, a laminated film composed of a quarter-wave plate and a cholesteric liquid crystal layer, or a laminated film composed of a quarter-wave plate and a plurality of cholesteric liquid crystal layers, the step of applying a liquid crystal composition containing a polymerizable liquid crystal compound and other components directly to a surface of the quarter-wave plate or the previous cholesteric liquid crystal layer, the alignment step, and the fixation step may be repeated. Alternatively, cholesteric liquid crystal layers, a quarter-wave plate, or a laminate thereof may be separately prepared and laminated together using, for example, an adhesive. The former method is preferred. One reason is that interference fringes due to the unevenness in the thickness of a bonding layer are less likely to be observed. Another reason is that since the laminated film of cholesteric liquid crystal layers is formed such that the next cholesteric liquid crystal layer is formed so as to be in direct contact with a surface of the previously formed cholesteric liquid crystal layer, the alignment azimuth of liquid crystal molecules on the air interface side of the previously formed cholesteric liquid crystal layer agrees with the alignment azimuth of liquid crystal molecules on the lower side of the cholesteric liquid crystal layer formed thereon, and the laminate of cholesteric liquid crystal layers has good polarization properties.

For example, a plurality of cholesteric liquid crystal layers may be sequentially formed on a temporary support to form a circularly polarized light reflecting layer. The surface of the circularly polarized light reflecting layer is bonded to a transparent substrate, and then the temporary support is peeled off as required to obtain a half mirror. Alternatively, a quarter-wave plate and a cholesteric liquid crystal layer may be sequentially formed on a temporary support to form a laminate of the quarter-wave plate and the circularly polarized light reflecting layer. The surface of the circularly polarized light reflecting layer is bonded to a transparent substrate, and then the temporary support is peeled off as required to obtain a half mirror including the quarter-wave plate.

Bonding Layer

The half mirror may include, in addition to the adhesive layer for bonding a polarized light reflecting layer and a transparent substrate to each other, a bonding layer for bonding other layers together.

According to the type of setting, adhesives for forming the bonding layer are classified into hot melt adhesives, thermosetting adhesives, photosetting adhesives, reaction-setting adhesives, and pressure-sensitive adhesives requiring no setting. Examples of usable materials for these adhesives include compounds such as acrylate compounds, urethane compounds, urethane acrylate compounds, epoxy compounds, epoxy acrylate compounds, polyolefin compounds, modified olefin compounds, polypropylene compounds, ethylene vinyl alcohol compounds, vinyl chloride compounds, chloroprene rubber compounds, cyanoacrylate compounds, polyamide compounds, polyimide compounds, polystyrene compounds, and polyvinyl butyral compounds. From the viewpoint of workability and productivity, the type of setting is preferably photosetting, and from the viewpoint of optical transparency and heat resistance, the material for use is preferably, for example, an acrylate compound, a urethane acrylate compound, or an epoxy acrylate compound.

The bonding layer may be formed using an OCA tape. The high-transparency adhesive transfer tape may be a commercially available product for an image display device, particularly, a commercially available product for an image display unit surface of an image display device. Examples of such a commercially available product include adhesive sheets (e.g., PD-S1) manufactured by Panac Corporation and MHM series of adhesive sheets manufactured by Nichiei Kakoh Co., Ltd.

Method for Producing Half Mirror

The half mirror can be formed by bonding a polarized light reflecting layer and a transparent substrate to each other with an adhesive layer interposed therebetween.

As described above, the adhesive layer is typically produced on a surface of a release sheet and thus can be conveyed and stored without any processing. The release sheet is peeled off the adhesive layer before bonding the polarized light reflecting layer and the transparent substrate to each other.

Mirror with Image Display Function

The half mirror can be combined with an image display device to provide a mirror with an image display function. In this case, the half mirror is, for example, disposed on or bonded to an image display unit surface of the image display device. The mirror with an image display function includes, in sequence, the image display device, a polarized light reflecting layer, an adhesive layer, and a transparent substrate. When a quarter-wave plate is included, the image display device, the quarter-wave plate, the circularly polarized light reflecting layer, the adhesive layer, and the transparent substrate are disposed in this order.

Although other layers such as a bonding layer may be disposed between the image display device and the half mirror, layers other than the bonding layer are preferably not disposed. That is, the image display device and the half mirror are preferably bonded directly to each other. The image display device need only be bonded to the half mirror through at least part of an image display unit. The area of the bonded surface of the half mirror may be smaller than, equal to, or larger than the area of the image display unit.

When the half mirror is bonded to the image display device, it is preferable to use an OCA tape. In this case, the thickness of the OCA tape is 10 µm or more and 200 µm or less, preferably 20 µm or more and 100 µm or less.

In the mirror with an image display function including a quarter-wave plate, the angle between the quarter-wave plate and the image display device is preferably adjusted so that images are most brightly displayed. Specifically, with respect particularly to an image display device that displays images by using linearly polarized light, the relation between the polarization direction (transmission axis) of the linearly polarized light and the slow axis of the quarter-wave plate is preferably adjusted so that the linearly polarized light can be best transmitted. For example, in the case of a single-layer quarter-wave plate, the transmission axis and the slow axis preferably form an angle of 45°. Light emitted from the image display device that displays images by using linearly polarized light becomes circularly polarized light of either a right-handed or left-handed sense after passing through the quarter-wave plate. The circularly polarized light reflecting layer described later is preferably constituted by a cholesteric liquid crystal layer having a twisted direction that allows circularly polarized light of the above sense to pass.

Image Display Device

The image display device is not particularly limited. The image display device is preferably an image display device that emits (gives off) linearly polarized light to form images, more preferably a liquid crystal display device or an organic EL device.

The liquid crystal display device may be of transmissive type or reflective type and is preferably of transmissive type. The liquid crystal display device may be any liquid crystal display device such as an in-plane switching (IPS) mode device, a fringe field switching (FFS) mode device, a vertical alignment (VA) mode device, an electrically controlled birefringence (ECB) mode device, a super twisted nematic (STN) mode device, a twisted nematic (TN) mode device, or an optically compensated bend (OCB) mode device.

Images displayed on the image display unit of the image display device may be still images, moving images, or simple textual information. The images may be displayed as monochrome images, such as black and white, multi-color images, or full-color images.

The image display device also preferably shows a red light emission peak wavelength $\lambda R$, a green light emission peak wavelength $\lambda G$, and a blue light emission peak wavelength $\lambda B$ in an emission spectrum at the time of white display. Having such emission peak wavelengths enables a full-color image display. $\lambda R$ is 580 to 700 nm, preferably 610 to 680 nm. $\lambda G$ is 500 to 580 nm, preferably 510 to 550 nm. $\lambda B$ is 400 to 500 nm, preferably 440 to 480 nm.

Applications of Mirror with Image Display Function

The mirror with an image display function may be used in any applications. For example, the mirror can be used as a security mirror, a mirror in a beauty parlor or barbershop, or the like to display images such as textual information, still images, and moving images. The mirror with an image display function may be a vehicle rear-view mirror or may be used in television sets, personal computers, smartphones, and cellular phones.

EXAMPLES

The present invention will now be described in more detail with reference to examples. Materials, reagents, amounts and percentages of substances, operations, etc. used in the following examples can be changed as appropriate without departing from the spirit of the present invention. Therefore, it should be noted that the following examples are not intended to limit the scope of the present invention.

In EXAMPLES, amounts expressed simply in "parts" are "parts by mass".

Preparation of Acrylic Adhesive Solution A

While 95 parts of butyl acrylate (manufactured by Mitsubishi Chemical Corporation), 5 parts of acrylic acid (manufactured by Mitsubishi Chemical Corporation), and 0.1 parts of 2,2'-azobisisobutyronitrile serving as a polymerization initiator were gently stirred in a flask together with 200 parts of ethyl acetate, the flask was purged with nitrogen by introducing nitrogen gas. Thereafter, a polymerization reaction was run for 6 hours while maintaining the temperature of the solution in the flask at around 60° C. to prepare an acrylic polymer solution. Ethyl acetate was further added to the acrylic polymer solution to a total solids concentration of 30 mass %. Next, a predetermined amount (Table 3) of 2-hydroxy-2-methyl-[4-(1-methylvinyl)phenyl]propanol oligomer (KIP-150, manufactured by Nihon SiberHegner K.K.) serving as a photo-crosslinker, a predetermined amount (Table 3) of trimethyloltolylene diisocyanate (CORONATE L manufactured by Nippon Polyurethane Industry Co., Ltd.) serving as a thermal crosslinker, and 0.2 parts of 3-isocyanatopropyltriethoxysilane (KBE-9007 manufactured by Shin-Etsu Chemical Co., Ltd.) were added thereto, the amounts being based on 100 parts of the solids content of the acrylic polymer solution, thereby preparing acrylic adhesive solution A. The weight-average molecular weight of the acrylic polymer was measured by GPC to be 1,550,000.

Preparation of Acrylic Adhesive Solution B

While 99 parts of butyl acrylate (manufactured by Mitsubishi Chemical Corporation), 1 part of 4-hydroxybutyl acrylate (manufactured by Nippon Kasei Chemical Co., Ltd.), and 0.1 parts of 2,2'-azobisisobutyronitrile serving as a polymerization initiator were gently stirred in a flask together with 200 parts of ethyl acetate, the flask was purged with nitrogen by introducing nitrogen gas. Thereafter, a polymerization reaction was run for 6 hours while maintaining the temperature of the solution in the flask at around 60° C. to prepare an acrylic polymer solution. Ethyl acetate was further added to the acrylic polymer solution to a total solids concentration of 30 mass %. Next, a predetermined amount (Table 3) of benzophenone (manufactured by Kanto Kagaku.) serving as a photo-crosslinker, a predetermined amount (Table 3) of trimethyloltolylene diisocyanate (CORONATE L manufactured by Nippon Polyurethane Industry Co., Ltd.) serving as a thermal crosslinker, and 0.2 parts of 3-isocyanatopropyltriethoxysilane (KBE-9007 manufactured by Shin-Etsu Chemical Co., Ltd.) were added thereto, the amounts being based on 100 parts of the solids content of the acrylic polymer solution, thereby preparing acrylic adhesive solution B. The weight-average molecular weight of the acrylic polymer was measured by GPC to be about 1,750,000.

Preparation of Acrylic Adhesive Solution C

While 99 parts of butyl acrylate, 1 part of 4-hydroxybutyl acrylate, and 0.1 parts of 2,2'-azobisisobutyronitrile serving as a polymerization initiator were gently stirred in a flask together with 200 parts of ethyl acetate, the flask was purged with nitrogen by introducing nitrogen gas. Thereafter, a polymerization reaction was run for 6 hours while maintaining the temperature of the solution in the flask at around 60° C. to prepare an acrylic polymer solution. Ethyl acetate was further added to the acrylic polymer solution to a total solids concentration of 30 mass %. Next, a predetermined amount (Table 3) of trimethyloltolylene diisocyanate (CORONATE L manufactured by Nippon Polyurethane Industry Co., Ltd.) serving as a thermal crosslinker, and 0.2 parts of 3-isocyanatopropyltriethoxysilane (KBE-9007 manufactured by Shin-Etsu Chemical Co., Ltd.) serving as a silane coupling agent were added thereto, the amounts being based on 100 parts of the solids content of the acrylic polymer solution, thereby preparing acrylic adhesive solution C. The weight-average molecular weight of the acrylic polymer was measured by GPC to be about 1,750,000.

Production of Cholesteric Liquid Crystal Film

According to the compositions shown below, coating solution 1 for a phase difference film and coating solutions 2 to 4 for forming cholesteric liquid crystal layers were prepared.

TABLE 1

| Type | Material (manufacturer) | Coating solution 1 (phase difference layer) | Coating solution 2 (630 nm) | Coating solution 3 (540 nm) | Coating solution 4 (450 nm) |
|---|---|---|---|---|---|
| Rod-like liquid crystal compound | Compound 1 shown below | 100 parts by mass | 100 parts by mass | 100 parts by mass | 100 parts by mass |
| Chiral agent for right twist | Paliocolor LC756 (BASF) | none | 4.7 parts by mass | 5.5 parts by mass | 6.7 parts by mass |
| Polymerization initiator | Irgacure819 (BASF) | 4 parts by mass | 4 parts by mass | 4 parts by mass | 4 parts by mass |
| Alignment controlling agent | Compound 2 shown below | 0.1 parts by mass | 0.1 parts by mass | 0.1 parts by mass | 0.1 parts by mass |
| Crosslinker | A-TMMT (Shin-Nakamura Chemical Co., Ltd.) | 1.0 part by mass | 1.0 part by mass | 1.0 part by mass | 1.0 part by mass |
| Solvent | 2-Butanone (Wako Pure Chemical Industries, Ltd.) | 170 parts by mass | 170 parts by mass | 170 parts by mass | 170 parts by mass |

Rod-like liquid crystal compound:

compound 1

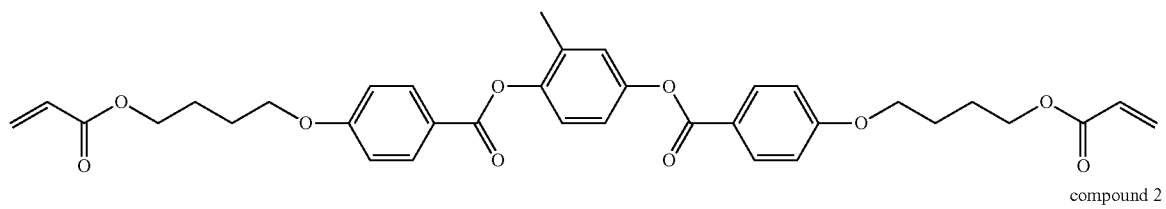

Alignment controlling agent:

compound 2

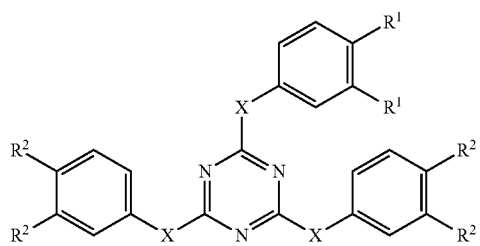

| R[1] | R[2] | X |
|---|---|---|
| O(CH$_2$)$_2$O(CH$_2$)$_2$(CF$_2$)$_6$F | O(CH$_2$)$_2$O(CH$_2$)$_2$(CF$_2$)$_6$F | NH |

Compound 2 was produced by a method described in JP2005-99248A.

A PET film (Cosmoshine A4100; thickness, 100 μm) manufactured by Toyobo Co., Ltd. was used as a temporary support (280 mm×85 mm) and subjected to a rubbing treatment (rayon cloth; pressure, 0.1 kgf (0.98 N); the number of revolutions, 1,000 rpm; transport speed, 10 m/min; the number of reciprocating cycles, 1).

Coating solution 1 was applied to the rubbed surface of the PET film by using a wire bar and then dried. The coated film was placed on a hot plate at 30° C. and irradiated with UV light for 6 seconds using a D-bulb electrodeless lamp (60 mW/cm$^2$) manufactured by Fusion UV Systems, Inc. to fix the liquid crystalline phase, thereby obtaining a phase difference layer having a thickness of 0.65 μm. A portion of the phase difference layer was cut out and bonded to an acrylic sheet (thickness: 0.3 mm) by using an adhesive sheet (PDS-1) manufactured by Panac Corporation. Thereafter, the temporary support was peeled off, and using an AxoScan manufactured by Axometrics, the phase difference (front retardation, Re) was measured to determine that Re was 115 nm at a wavelength of 500 nm.

Using coating solutions 2, 3, and 4 in this order, layers were repeatedly formed on the surface of the phase difference layer in the same manner as the phase difference layer, thereby obtaining laminate A of the phase difference layer and the three cholesteric liquid crystal layers. Laminate A had a thickness, excluding the thickness of the temporary support, of 8.5 μm. A reflection spectrum measurement at a specular reflection angle of 5° using a spectrophotometer (V-670 manufactured by JASCO Corporation) showed that laminate A had a reflection spectrum having selective reflection (reflectivity: 47%) center wavelengths at 630 nm, 540 nm, and 450 nm and a visible light reflectivity of 40.4%.

A predetermined amount of 2 mass % solution of long-chain-alkyl-modified poval (MP-203, manufactured by Kuraray Co., Ltd.) was applied to a triacetyl cellulose support (FUJITAC, manufactured by FUJIFILM Corporation) having a thickness of 60 μm and then dried to form an alignment film resin layer having a thickness of 1.0 μm. Thereafter, the alignment film resin layer was subjected to a rubbing treatment (rayon cloth; pressure, 0.98 N (0.1 kgf); the number of revolutions, 1,000 rpm; transport speed, 10 m/min; the number of reciprocating cycles, 1). Laminate B was formed in the same manner as laminate A except that this support was used in place of the above-described temporary support and coating solution 1 was applied to the rubbing-treated surface. The thickness including triacetyl cellulose was 69.5 μm, and the total thickness of the layers formed of coating solutions 1 to 4 was 8.5 μm. The visible light reflectivity was 40.7%.

Production of Reflective-Type Linearly Polarized Light Film

A linearly polarized light reflecting plate was fabricated according to a method described in JP1997-506837A (JP-H9-506837A). Using ethylene glycol as a diol, 2,6-polyethylene naphthalate (PEN) and a copolyester (coPEN) of naphthalate 70/terephthalate 30 were synthesized in a standard polyester resin synthesis kettle. Monolayer films of PEN and coPEN were extruded and then stretched in a stretching ratio of 5:1 at about 150° C. The refractive index of the PEN associated with the oriented axis was about 1.88, and the refractive index associated with the transverse axis was 1.64. The refractive index of the coPEN film was about 1.64.

Subsequently, alternating layers of PEN and coPEN with thicknesses shown in Table 2 (1) were formed by coextrusion using a 50-slot feed block provided with a standard extrusion die. This was repeated to form layers of PEN and coPEN shown by (2) to (5) in Table 2 one after another, and the formation of the layers (1) to (5) was repeated 50 times to form a stack of 250 alternating layers. Thereafter, the stretched film was heat set at about 230° C. for 30 seconds in an air oven to obtain laminate C.

TABLE 2

| | (1) | (2) | (3) | (4) | (5) |
|---|---|---|---|---|---|
| PEN | 63.4 nm | 71.5 nm | 79.6 nm | 87.7 nm | 95.8 nm |
| coPEN | 68.5 nm | 77.2 nm | 86.0 nm | 94.7 nm | 103.5 nm |

A reflection spectrum measurement at a specular reflection angle of 5° using a spectrophotometer (V-670 manufactured by JASCO Corporation) showed that laminate C had a reflection spectrum with a reflection band of 400 to 700 nm and a visible light reflectivity of 42.7%. Laminate C had a thickness of 9.2 μm.

Fabrication of Half Mirror

Examples 1 to 10 and Comparative Examples 4 to 7

Acrylic adhesive solution A or B was uniformly applied to a release-treated surface of a polyethylene terephthalate film (release liner; MRF38 manufactured by Mitsubishi Polyester Film Corporation) by using a wire bar, the surface being treated with a silicone-based release agent, and then dried in an oven at 85° C. for 3 minutes to form an adhesive layer having a thickness shown in Table 3 on the surface of the release liner. Next, the adhesive layer formed on the release-treated surface of the release liner was irradiated with UV light for 30 seconds using a D-Bulb electrodeless lamp (60 mW/cm$^2$) manufactured by Fusion UV Systems, Inc. Thereafter, the adhesive layer on the release liner was bonded to a glass plate having a thickness of 1.8 mm, and the release liner was peeled off the adhesive layer. Lastly, laminate A, B, or C was bonded to the adhesive layer on the glass plate, and in the case where laminate A was used, the temporary support was peeled off laminate A to fabricate a half mirror.

Comparative Examples 1 to 3

Acrylic adhesive solution C was uniformly applied to a release-treated surface of a polyethylene terephthalate film (release liner; MRF38 manufactured by Mitsubishi Polyester Film Corporation) by using a wire bar, the surface being treated with a silicone-based release agent, and then dried in an oven at 85° C. for 3 minutes to form an adhesive layer having a thickness shown in Table 3 on the surface of the release liner. Next, to the opposite surface of the adhesive layer from the release liner, another release liner was bonded, and aging treatment was performed at 25° C. for 7 days. Thereafter, one of the release liners was peeled off, and the adhesive layer was bonded to a glass plate having a thickness of 1.8 mm, after which the other remaining release liner was peeled off. Lastly, laminate A was bonded to the adhesive layer on the glass plate, and then the temporary support was peeled off laminate A to fabricate a half mirror.

Comparative Example 8

A half mirror was fabricated in the same manner as in Comparative Examples 1 to 3 except that an adhesive layer having a thickness of 5 μm was formed using acrylic adhesive solution A instead of acrylic adhesive solution C.

Gel Fraction Measurement

The gel fraction of the adhesive layers used to fabricate the half mirrors was measured in the following manner. W1 (g) of the adhesive layer after being cured was sampled and immersed in ethyl acetate at 23° C. for 7 days. Thereafter, insoluble matter of the adhesive layer was collected from the ethyl acetate and dried at 130° C. for 2 hours. The mass W2 (g) of the resulting adhesive layer was measured. The gel fraction (mass %) was calculated as (W2/W1)×100.

Evaluations of Half Mirror

Measurement of Image Clarity

The clarity of mirror-reflected images of the half mirrors was measured in accordance with JIS K7374: 2007 using an ICM-IT manufactured by Suga Test Instruments Co., Ltd. The measurement was performed by a reflection method at a light incidence angle of 45°. The light was incident on the non-bonded surface (glass plate side surface), and optical combs of 0.5 mm and 0.125 mm were employed.

Measurement of Visible Light Reflectivity

According to a calculation method described in JIS A5759, the visible light reflectivity of the half mirrors was determined using a V-670 spectrophotometer manufactured by JASCO Corporation. Each half mirror had a visible light reflectivity substantially equal to that of the laminate used.

Measurement of Mirror Performance

A fluorescent lamp was reflected on the glass plate side surface of each half mirror, and undulation and distortion of the profile of the reflected fluorescent lamp were observed. The evaluation was performed according to the following criteria.

A: Substantially no orange-peel-like undulation or profile distortion is observed.
B: Orange-peel-like undulation and profile distortion are minor.
C: Orange-peel-like undulation and profile distortion are major.

Durability

After the half mirrors were allowed to stand in an 85° C./85% environment for 500 hours, their appearance was observed with a 10×-loupe from the glass plate side. The evaluation was performed according to the following criteria.

A: No change in appearance (no lifting, peeling, foaming, wrinkling, or the like is observed at ends).
C: Lifting, peeling, foaming, wrinkling, or the like is observed at ends.

Adhesiveness

CELLOTAPE (registered trademark, manufactured by Nichiban Co., Ltd.) was applied to the bonded-surface side of each half mirror so as to protrude from an end and left to stand for 30 minutes, and the CELLOTAPE was then peeled off from the protruding end side to determine whether the reflection layer was peeled off. The evaluation was performed according to the following criteria.

A: The reflection layer is not peeled off.
C: The reflection layer is peeled off from the end.

TABLE 3

| | Adhesive layer | | | | | | |
|---|---|---|---|---|---|---|---|
| | Adhesive solution | Photo-crosslinker* | Thermal crosslinker* | Thickness (μm) | UV irradiation | Aging | Gel fraction (mass %) |
| Example 1 | A | 1.0 | 0 | 5 | yes | no | 71.2 |
| Example 2 | A | 1.0 | 0.25 | 5 | yes | no | 82.7 |
| Example 3 | A | 4.0 | 0 | 10 | yes | no | 84.3 |
| Example 4 | A | 8.0 | 0 | 15 | yes | no | 88.6 |
| Example 5 | B | 1.0 | 0 | 5 | yes | no | 70.1 |
| Example 6 | B | 1.0 | 0.25 | 5 | yes | no | 81.8 |
| Example 7 | B | 4.0 | 0 | 10 | yes | no | 84.1 |
| Example 8 | B | 8.0 | 0 | 15 | yes | no | 87.5 |
| Example 9 | B | 4.0 | 0 | 10 | yes | no | 84.1 |
| Example 10 | B | 4.0 | 0 | 10 | yes | no | 84.1 |
| Comparative Example 1 | C | 0 | 0.5 | 10 | no | yes | 84.6 |
| Comparative Example 2 | C | 0 | 0.75 | 10 | no | yes | 86.7 |
| Comparative Example 3 | C | 0 | 1.0 | 10 | no | yes | 88.1 |
| Comparative Example 4 | A | 4.0 | 0 | 1 | yes | no | 90.3 |
| Comparative Example 5 | A | 4.0 | 0 | 20 | yes | no | 79.3 |
| Comparative Example 6 | A | 0.5 | 0 | 5 | yes | no | 25.1 |
| Comparative Example 7 | A | 10.0 | 0 | 5 | yes | no | 92.7 |
| Comparative Example 8 | A | 1.0 | 1.0 | 5 | no | yes | 89.1 |

| | Light reflecting layer | Durability | Adhesiveness | Image clarity (%) | | Mirror performance |
|---|---|---|---|---|---|---|
| | | | | 0.5 mm | 0.125 mm | |
| Example 1 | laminate A | A | A | 97.1 | 80.7 | A |
| Example 2 | laminate A | A | A | 96.1 | 78.9 | A |
| Example 3 | laminate A | A | A | 96.9 | 70.1 | B |
| Example 4 | laminate A | A | A | 90.4 | 71.0 | B |
| Example 5 | laminate A | A | A | 97.2 | 82.3 | A |

TABLE 3-continued

| | | | | | | |
|---|---|---|---|---|---|---|
| Example 6 | laminate A | A | A | 96.2 | 79.7 | A |
| Example 7 | laminate A | A | A | 96.6 | 72.8 | B |
| Example 8 | laminate A | A | A | 90.6 | 70.8 | B |
| Example 9 | laminate B | A | A | 97.4 | 82.9 | A |
| Example 10 | laminate C | A | A | 96.1 | 71.3 | B |
| Comparative Example 1 | laminate A | A | A | 88.3 | 50.2 | C |
| Comparative Example 2 | laminate A | A | A | 88.1 | 49.6 | C |
| Comparative Example 3 | laminate A | A | A | 88.9 | 44.7 | C |
| Comparative Example 4 | laminate A | A | C | 97.2 | 82.1 | A |
| Comparative Example 5 | laminate A | A | A | 85.2 | 64.2 | C |
| Comparative Example 6 | laminate A | C | A | 94.9 | 78.7 | A |
| Comparative Example 7 | laminate A | A | C | 94.9 | 78.7 | A |
| Comparative Example 8 | laminate A | A | A | 87.1 | 49.1 | C |

*Parts by mass based on 100 parts by mass of acrylic polymer

In Examples 1 to 10, half mirrors having durability and adhesiveness, capable of displaying bright and clear images and mirror-reflected images, and suitable for industrial production were obtained.

What is claimed is:

1. A half mirror comprising, in sequence: a transparent substrate; an adhesive layer; and a polarized light reflecting layer,
   wherein the transparent substrate and the adhesive layer are in direct contact with each other, and the adhesive layer and the polarized light reflecting layer are in direct contact with each other,
   the half mirror has an image clarity value of 90% or more at an optical comb of 0.5 mm, an image clarity value of 70% or more at an optical comb of 0.125 mm, and a visible light reflectivity of 30% or more, the image clarity values being determined by a method for measuring image clarity in accordance with JIS K7374 in a reflectivity mode at an angle of 45° from the transparent substrate side,
   the transparent substrate is a glass plate,
   the polarized light reflecting layer has a thickness of 5.0 µm to 80 µm,
   the adhesive layer is a layer formed by UV-curing of a composition containing an acrylic polymer having a weight-average molecular weight of 800,000 to 2,000,000, a crosslinker, and a silane coupling agent,
   a total amount of the crosslinker is 1.0 mass % to 8.0 mass % of an amount of the acrylic polymer,
   the crosslinker includes a photo-crosslinker and a thermal crosslinker,
   80 mass % or more of the crosslinker is accounted for by the photo-crosslinker, and
   the adhesive layer has a thickness of 3 µm to 15 µm.

2. The half mirror according to claim 1, wherein the transparent substrate and the polarized light reflecting layer are bonded to each other with the adhesive layer.

3. The half mirror according to claim 1, wherein the polarized light reflecting layer includes a cholesteric liquid crystal layer.

4. The half mirror according to claim 3, further comprising a quarter-wave plate,
   wherein the transparent substrate, the adhesive layer, the polarized light reflecting layer, and the quarter-wave plate are disposed in this order.

5. The half mirror according to claim 1, wherein the polarized light reflecting layer includes two or more cholesteric liquid crystal layers, and the two or more cholesteric liquid crystal layers have different selective reflection center wavelengths.

6. The half mirror according to claim 1, wherein the polarized light reflecting layer is a linearly polarized light reflecting layer having a multilayer structure in which differently birefringent resins are alternately stacked.

7. A mirror with an image display function, comprising: an image display device; and the half mirror according to claim 1,
   wherein the image display device, the polarized light reflecting layer, the adhesive layer, and the transparent substrate are disposed in this order.

8. A method for producing a half mirror including, in sequence, a transparent substrate, an adhesive layer, and a polarized light reflecting layer, the method comprising the successive steps of:
   providing, as the adhesive layer, a layer formed by UV-curing of a composition containing an acrylic polymer having a weight-average molecular weight of 800,000 to 2,000,000, a crosslinker, and a silane coupling agent, a total amount of the crosslinker being 1.0 mass % to 8.0 mass % of an amount of the acrylic polymer, the crosslinker including a photo-crosslinker and a thermal crosslinker, 80 mass % or more of the crosslinker being accounted for by the photo-crosslinker; and
   bonding the polarized light reflecting layer and the transparent substrate to each other with the adhesive layer interposed therebetween,
   wherein the half mirror has an image clarity value of 90% or more at an optical comb of 0.5 mm, an image clarity value of 70% or more at an optical comb of 0.125 mm, and a visible light reflectivity of 30% or more, the image clarity values being determined by a method for measuring image clarity in accordance with JIS K7374 in a reflectivity mode at an angle of 45° from the transparent substrate side,
   the transparent substrate is a glass plate, and
   the polarized light reflecting layer has a thickness of 5.0 µm to 80 µm.

9. The method according to claim 8, wherein the adhesive layer is provided on a surface of a release sheet, and the release sheet is peeled off before the bonding.

10. The method according to claim 9, wherein the UV-curing is performed on the composition applied to the surface of the release sheet.

\* \* \* \* \*